Oct. 18, 1927.  1,645,978
G. H. WILLEY
CIRCUIT CLOSING DEVICE
Filed Aug. 23, 1922
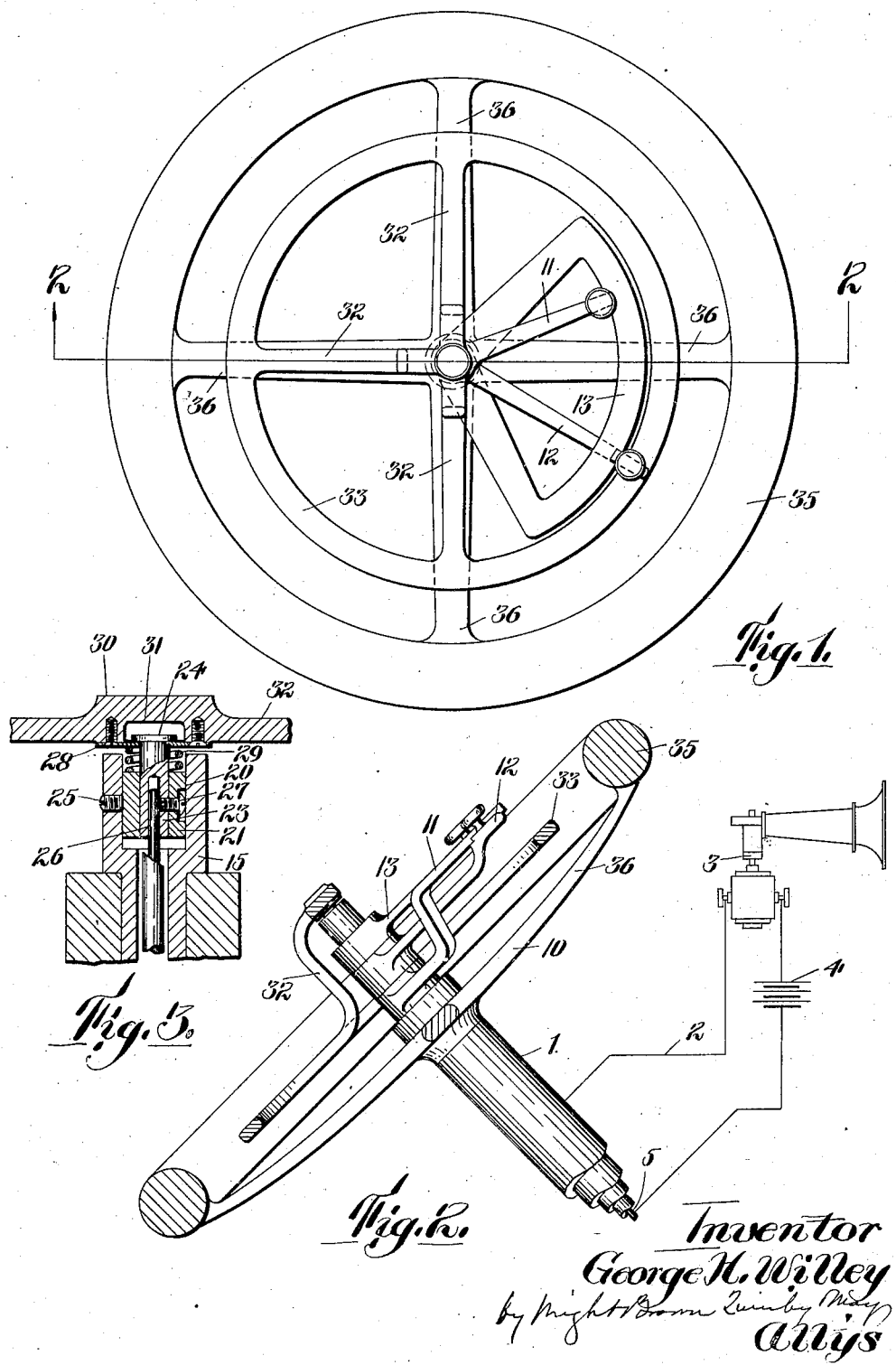

Patented Oct. 18, 1927.

1,645,978

UNITED STATES PATENT OFFICE.

GEORGE H. WILLEY, OF SOMERVILLE, MASSACHUSETTS, ASSIGNOR TO WILLEY-NOYES MANUFACTURING COMPANY, OF BOSTON, MASSACHUSETTS, A CORPORATION OF MASSACHUSETTS.

CIRCUIT-CLOSING DEVICE.

Application filed August 23, 1922. Serial No. 583,726.

Many makes of automobiles are now equipped with a warning signal actuating button positioned at the upper end of the steering column. With such a construction it is necessary for the vehicle driver to release one hand from the steering wheel in order to actuate the signal but as it permits the wiring to be positioned within the column, this construction has been more and more adopted on account of reduced fire risk.

The present invention provides a construction wherein the advantages of the interior wiring are obtained and yet wherein the signal may be actuated without requiring the removal of one hand from the steering wheel, the signal actuator being readily accessible to the operator's hand while grasping any portion of the steering wheel rim. Furthermore it requires a minimum change from the center button construction and requires only the simplest tools to attach. It may in fact be so assembled that by merely removing a switch unit of the former construction after releasing a set screw, a similar unit provided with the actuator of this invention may be substituted and fixed in position by means of the same set screw. This is of great advantage inasmuch as it requires no redesigning or special construction at the upper end of the steering post and the substitution of the device of the present invention for a part of the former construction is rendered an easy matter.

Further objects and advantageous details and combinations of parts will appear from a more complete description of an embodiment thereof disclosed in the accompanying drawings in which Figure 1 is an end view of the steering column showing the device in position thereon.

Figure 2 is a side elevation partly in section of the same parts.

Figure 3 is a detail cross section at the upper end of the steering column showing the device of the invention in position.

Referring first to Figure 2, 1 indicates in general the steering column to which is connected by a conductor 2, one terminal of the signal indicated at 3. The other terminal is connected to one side of a source of electrical supply, such as a battery 4 and the other side of this battery in turn is connected to a central conductor 5 which extends axially within the steering column. Carried near the upper end of this column is the usual steering wheel 10 and above this wheel are shown positioned the throttle and spark levers 11 and 12 riding on the segment 13. The steering column has a stationary sleeve element 15 through which the conductor 5 passes and its upper end is formed with a recess 20 to receive a portion of the circuit closer for the signal circuit. Since one side of the signal circuit is connected to the steerng post, in order to complete the circuit it is only necessary to make contact between conductor 5 and the column. The sleeve 15 therefore may furnish one of the contact elements.

Within the recess 20 is positioned a block of insulation 21 formed as a sleeve and positioned within the bore of this sleeve is a rod 23 having a head 24 at its upper end. The block or sleeve 21 may be fixed in position in the recess 20 by means of a set screw 25. Conductor 5 as shown extends within a bore 26 in the rod 23 and is fixed therein by means of a set screw 27. Slidable axially of the rod 23 is a contact element 28 in the form of a ring which may be moved toward and from the end of the member 15 to make and break electrical contact therewith. This ring 28 is normally held out of contact with the member 15 and against the head 24 by means of a coil spring 29 encircling the rod and reacting between the upper face of the block 21 and the lower face of the ring 28.

For the purpose of depressing this ring 28 it is shown as attached to the central portion of a spider 30 having a recess 31 within which the head 24 may move. This spider 30 has a plurality of arms 32 radiating therefrom which carry a ring-shaped actuating member 33 at their outer ends. This member 33 is arranged concentrically with the steering column and adjacent the rim 35 of the steering wheel 10, so that as the driver grasps this rim the member 33 is in convenient position to be engaged by the thumb or finger so to be depressed by pressure exerted thereon, but is spaced sufficiently from the rim so as not to interfere with the grasp of the operator's hand thereon. Preferably the spider and actuating member 33 are of conducting material so that an electrical contact may be made by tilting the ring member 33 until it impinges on one or more of the spokes 36 of the steering wheel or it may be depressed bodily so as to bring the ring 28 in contact with the upper end of the sleeve 15. The parts may be so proportioned that when the actuating member 33 is tilted by pressure exerted at one point only, contact may be made either between the ring member 28 and the sleeve 15 or between the actuating member 33 and the steering wheel spoke, or both may be made simultaneously. In any event the spring 29 should be of sufficient strength to return the ring contact 28 and the actuating member 33 to inoperative non-contacting position on release of pressure exerted thereon.

The recess 20 in the sleeve 15 is now commonly employed to contain one element of the circuit closer and to retain the parts assembled the screw 25 is used. In order to place the device of this invention in position it is therefore only necessary to loosen the set screw 25, remove the button contacting device and insert the sleeve 21 with the parts assembled therewith after the conductor 5 has been fixed to the rod 23.

From this description it will be seen that the interior wiring of the steering column is maintained and that the movable contact device of the invention may be assembled with the steering column normally designed to receive an actuating button contact at its upper end without any modification of the steering column. While as shown the upper end of the sleeve 15 extends beyond the plane of the steering wheel rim 35 and thus necessitates that the arms 32 of the spider shall be inwardly turned to bring the member 33 in proper relation to the steering wheel rim, in some designs of cars this is not necessary, the signal actuating button being positioned more nearly in the plane of the steering wheel rim. While three radiating arms for this spider are shown, it is evident that any suitable number may be employed and spaced in any desired manner, it being only necessary to so space these members as to avoid interfering in any manner with the engine control levers 11 and 12.

Having thus described an embodiment of this invention it should be evident that many changes and modifications may be made therein without departing from its spirit or scope as defined by the appended claims.

I claim:

1. In combination with a steering column having an axial recess at its upper end and a steering wheel carried by said column, of a sleeve of insulating material fitted within said recess, a headed rod of conducting material in one side of an electric circuit seated in said sleeve with its head spaced from the upper end thereof, a conducting ring in the opposite side of said circuit slidable axially of said rod into and out of contact with said column between the end of said sleeve and said head, a spring urging said ring against said head out of contact with said column, and a member fixed to said ring and extending adjacent the rim of said wheel by which said ring may be depressed.

2. The combination with a steering column having an axial recess at its upper end and a steering wheel having spokes of conducting material carried by said column, of a sleeve of insulating material fitted within said recess, a headed rod of conducting material in one side of an electrical circuit seated in said sleeve with its head spaced from the upper end thereof, a conducting ring in the opposite side of said circuit slidable axially of said rod into and out of contact with said column between the end of said sleeve and said head, a spring urging said ring against said head out of contact with said column, and a member fixed to said ring adjacent the rim of said wheel by which said ring may be depressed, said member being of conducting material and arranged to contact with spokes of said wheel to close the circuit.

3. A unitary device comprising a sleeve of insulating material which may be fixed in an axial recess in the upper end of a vehicle steering column, a headed rod of conducting material within said sleeve and to which one side of an electrical circuit may be fixed, said head being spaced from the upper end of said sleeve, a ring movable axially on said rod between the upper end of said sleeve and said head, a spring interposed between said ring and sleeve, arms radiating from said ring, and a ring-shaped member fixed to said arms.

4. A unitary device comprising a sleeve-shaped block of insulation formed to fit within a recess at the upper end of a vehicle steering column, a headed rod of conducting material in said block, the head spaced from the upper end of said block, means for attaching a conductor to said rod, a ring slidable on said rod between said head and block and forming a contact element of a circuit closer, a coil spring surrounding said rod and reacting between said block and ring, a spider fixed to said ring, and a ring-shaped actuating member fixed to the outer ends of the arms of said spider.

In testimony whereof I have affixed my signature.

GEORGE H. WILLEY.